（12）United States Patent
Inglin et al.

(10) Patent No.: US 8,920,701 B2
(45) Date of Patent: Dec. 30, 2014

(54) METHOD FOR PRODUCING CERAMIC ARTICLES

(75) Inventors: Urs Inglin, Lachen (CH); Peter Schwendener, Samstagern (CH); Margit Harsch, Tuggen (CH)

(73) Assignee: Geberit International AG, Jona (CH)

( * ) Notice: Subject to any disclaimer, the term of this patent is extended or adjusted under 35 U.S.C. 154(b) by 253 days.

(21) Appl. No.: 13/489,828

(22) Filed: Jun. 6, 2012

(65) Prior Publication Data

US 2012/0313292 A1 Dec. 13, 2012

(30) Foreign Application Priority Data

Jun. 7, 2011 (EP) .................................... 11168921

(51) Int. Cl.
*B29C 39/26* (2006.01)
*B28B 7/28* (2006.01)
*B29C 41/38* (2006.01)
*B29C 41/40* (2006.01)
*B28B 7/30* (2006.01)
*B29C 39/00* (2006.01)
*B28B 1/26* (2006.01)

(52) U.S. Cl.
CPC ................. *B28B 1/261* (2013.01); *B28B 7/285* (2013.01); *B29C 41/38* (2013.01); *B29C 41/40* (2013.01); *B28B 7/303* (2013.01); *B29C 39/003* (2013.01)
USPC ............................................. 264/299; 249/63

(58) Field of Classification Search
CPC .......... B28B 1/261; B28B 7/28; B28B 7/285; B29C 39/003; B29C 41/38; B29C 41/40
USPC ............................................. 264/299; 249/63
See application file for complete search history.

(56) References Cited

U.S. PATENT DOCUMENTS 3,218,376 A 11/1965 Schindler, Jr. et al.
3,812,229 A 5/1974 Anderson

FOREIGN PATENT DOCUMENTS

| JP | 4-69108 U | 6/1992 |
| JP | 9-164513 A | 6/1997 |
| JP | 2001-342671 A | 12/2001 |

*Primary Examiner* — Yogendra Gupta
*Assistant Examiner* — Robert J Grun
(74) *Attorney, Agent, or Firm* — Sughrue Mion, PLLC

(57) ABSTRACT

A method for producing a sanitary article, comprises the step of introducing liquid clay into the casting chamber of a casting mould, the step of hardening the liquid clay in the casting mould and the step of separating the casting mould for removing the hardened sanitary article out of the casting mould. Prior to the step of introducing the liquid clay, at least one slide is introduced from outside the casting chamber along an insertion direction (E) at least partially into the casting chamber, wherein the slide is removed out of the casting chamber in opposition to the insertion direction (E) prior to or during the step of separating the casting mould, wherein an opening, an indentation or a break-through can be provided in the sanitary article by means of the slide.

19 Claims, 4 Drawing Sheets

METHOD FOR PRODUCING CERAMIC ARTICLES

TECHNICAL SCOPE

The present invention relates to a method for producing ceramic articles, in particular sanitary articles, according to the preamble of claim 1 and to an associated device according to claim 7.

PRIOR ART

Sanitary articles such as, for example, a sink or a toilet bowl are known from the prior art. Such sanitary articles are typically produced by pouring porcelain compound or liquid clay under pressure into a casting mould and by subsequent hardening in the casting mould. Once successfully hardened, the sanitary article is stripped from the mould, that means is removed from the mould. During removal from the mould, the casting mould is separated at defined separating points and the individual casting mould parts are moved away from each other such that the sanitary article is able to be removed out of the casting mould.

Once removed from the mould, the sanitary article has to be subsequently treated many times in a mechanical manner because not all the elements can be produced directly on the sanitary article with the casting mould. This refers, for example, to openings which are arranged in many ways on the sanitary article in such a manner that they are not able to be produced with the casting mould because subsequent removal from the mould is no longer possible then as a result of the shape of said elements. The expert usually uses a drill for this purpose in order to drill the openings. However, it is precisely in the case of complex shapes that it is not always possible to carry out such bores at every point on the sanitary article.

It can be said in summary that said refining is costly and technically speaking is not always able to be provided, especially not, for example, when an opening is to be created at a site that is not accessible by a drill.

In addition, plugs, which the ceramic caster inserts into the casting mould, are known from the prior art, for example from U.S. Pat. No. 3,218,376. The use of such a plug has proven to be advantageous when comparatively large openings are to be formed. Contrary to this, in the case of openings with a small cross section within the range of a few millimetres, the desired accuracy can no longer be achieved using these types of plugs.

REPRESENTATION OF THE INVENTION

Proceeding from the prior art, the object underlying the invention is to provide a method which overcomes the disadvantages of the prior art. In particular, a method is to be provided which allows for the forming of openings on ceramic sanitary articles, in particular at places that are difficult to access.

Such an object is achieved by a method for producing a sanitary article according to claim 1. Accordingly, a method for producing a sanitary article, such as a toilet bowl, comprises the step of introducing liquid clay into the casting chamber of a casting mould, the step of hardening the liquid clay in the casting mould and the step of separating the casting mould for removing the hardened sanitary article out of the casting mould. Prior to the step of introducing the liquid clay, at least one slide, preferably a plurality of slides, is introduced from outside the casting chamber along an insertion direction at least partially into the casting chamber, wherein the slide is removed out of the casting chamber in opposition to the insertion direction prior to or during the step of separating the casting mould, wherein an opening, an indentation or a break-through can be provided in the sanitary article by means of the slide.

As a result of the arrangement of the slide, openings, indentations or break-throughs can be produced in a simple manner. As a result of the return movement of the slide prior to or during the step of removal from the mould, it is possible to form openings, indentations or break-throughs which are located at positions which do not allow for mould removal.

The slide is preferably displaced along a channel, which is arranged fixedly in the casting mould and opens out into the casting chamber via an inner wall, wherein the channel comprises at least one deflection section which deflects the channel with reference to the inner wall, wherein the slide is realized in a flexible manner such that the slide is deflected during the movement. The advantage of the deflection with reference to the inner wall, the form of which corresponds to the outer wall of the sanitary article, is that the slide can be deflected by the deflecting to positions that are difficult to access. As a result, obstacles or positioning problems as a result of the geometry of the sanitary article to be produced can be circumvented by such a deflection section.

The deflection section is preferably realized in a curved manner as a curved section, wherein the curved section is connected by means of a supply section which preferably extends at an angle with respect to the inner wall, and wherein the curved section, compared to the supply section, is connected to an end section which opens out directly or indirectly into the casting chamber.

The channel preferably opens out into the casting chamber in a predetermined direction, preferably substantially parallel, with respect to the inner wall of the casting chamber such that, in the state projecting into the casting chamber, the slide lies in the casting mould parallel to the inner wall by way of its free end. The predetermined direction can be fixed in an individual manner for each slide so that each opening has the most advantageous direction.

The slide preferably projects into the casting chamber, in particular into a hollow casting section, by way of a free end. The length of the free end along the inner wall of the casting chamber is preferably greater than the thickness of the sanitary article in the region such that it is possible to provide an opening through the sanitary article.

Preferably during the step of introducing the liquid clay a solid casting section and a hollow casting section are filled, wherein the hollow casting section is acted upon with compressed air such that the liquid clay is pressed onto the inner wall of the casting chamber, wherein once said action with compressed air has been successful, the slide is removed in opposition to the insertion direction out of the casting chamber.

A toilet bowl which is produced according to the method comprises a flange, a side wall which is realized in a circumferential manner connecting to the flange and a connecting pipe which connects to the side wall and has a U-bend section, wherein, in the region of the side wall, the toilet bowl has a plurality of openings which can be provided by means of the slide.

A device for carrying out the above-described method comprises a casting mould with a casting chamber and further at least one slide which can be pushed at least partially into the casting chamber from outside the casting chamber along an insertion direction and prior to the step of separating the casting mould can be removed out of the casting mould in opposition to the insertion direction out of the casting chamber, wherein an opening, an indention or a break-through can be provided in the sanitary article by means of the slide.

The slide is preferably displaceable along a channel which is arranged fixedly in the casting mould and opens out into the casting chamber by means of an inner wall, wherein the channel comprises at least one deflection section which deflects the channel with reference to the inner wall such that the slide is deflected during the movement.

The channel is in the form of a pipe recessed in the casting mould, wherein the slide is movable in the interior of the pipe, and wherein the pipe is realized in sections in a bent or curved manner so that the deflection section can be provided. The end face of the pipe is preferably flush with the inner wall of the casting chamber. As an alternative to this, the end face of the pipe is arranged offset from the inner wall of the casting chamber, wherein the channel is assembled from the pipe and a passage, which connects to the pipe and is part of the casting mould.

The free end of the slide has a rigidity of such a type that the slide maintains its position when the liquid clay is introduced, wherein the slide is preferably of plastics material, in particular nylon and/or metal. The slide itself has a flexibility which allows for the movement of the slide through the deflection section.

Further embodiments are provided in the dependent claims.

BRIEF DESCRIPTION OF THE DRAWINGS

Preferred embodiments of the invention are described below by way of the drawings, which serve purely for explanation and are not to be seen as restricting and in which.

DESCRIPTION OF PREFERRED EMBODIMENTS

Figure 1:
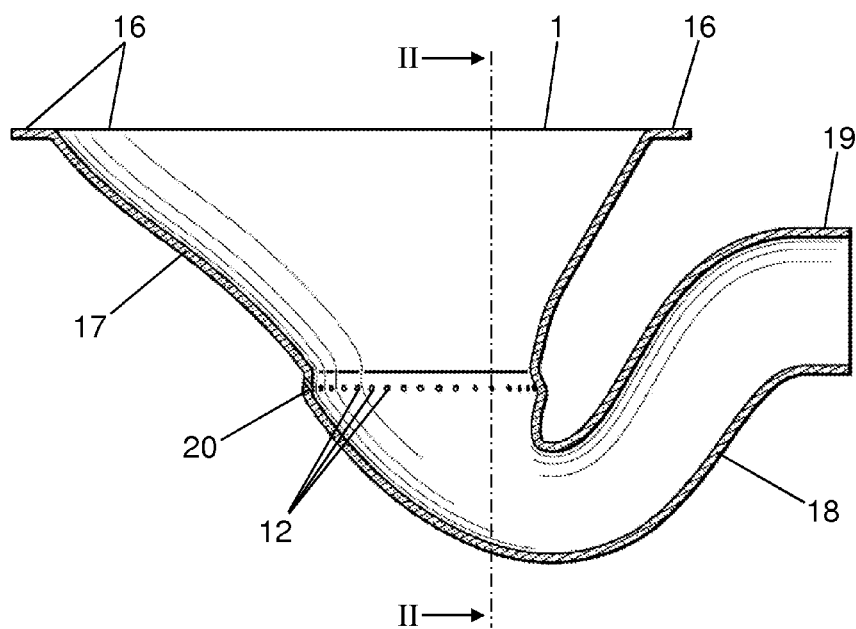
FIG. 1 shows a schematic sectional view of a toilet bowl which can be produced using the method and a device according to the present invention.

FIG. 1 shows a sanitary article 1 made of ceramic, in this case a toilet bowl. The toilet bowl comprises a seat 16, a side wall 17, which is realized in a circumferential manner and connects to the seat or flange 16, a U-bend section 18 which connects to the side wall 17 and, in this case, opens out into an outlet pipe 19. In the region of the side wall 17, the toilet bowl 1 further comprises a bead section 20, which runs around the side wall 17 and in which, in this case, a plurality of openings 12 are arranged. The openings 12, in this case, are oriented such that their centre axes extend as tangentially as possible with respect to the side wall 17. As a result, it is possible to provide a multitude of water jets through the openings and these have a cleaning effect on the toilet bowl 1 in the region of the U-bend 18. The provision of these types of openings by means of subsequent processing, such as by means of a drilling operation, is not technically translatable because, on account of the design of the side wall, it is not possible to guide the drilling tool at the desired angle to the position at which the openings 12 are to be arranged. Moulding the openings 12 is also not possible on account of the U-bend 18.

Figure 2:
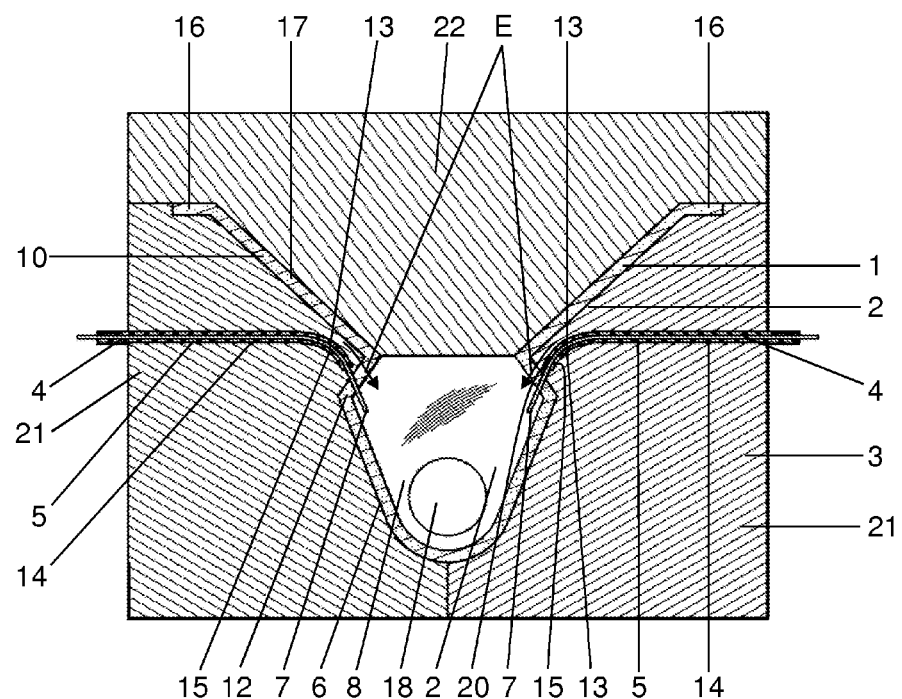
FIG. 2 shows a schematic sectional view of a casting mould in the close state, in which a sanitary article, in particular a toilet bowl according to FIG. 1, can be produced.

FIG. 2 shows a sectional view along the line II-II of the sanitary article according to FIG. 1 in a casting mould 3. The casting mould 3, in this case, comprises a casting chamber 2 into which liquid clay is filled and subsequently hardened to form ceramic. The liquid clay is a pasty to liquid compound which consists of solids and water, during the hardening operation the water being squeezed out of the liquid clay. The liquid clay is typically at room temperature or approximately between 40° C. and 45° C. when it is filled into the casting mould.

The casting mould 3, in this case, has a hollow casting section 8 and a solid casting section 10. In this case, the part of the toilet bowl which lies below the bead section 20 is formed in the hollow casting section 8. In this case, liquid clay is filled into the mould and is pressed against the inner wall 6 of the hollow casting section 8 by means of compressed air. In the solid casting section 10, the liquid clay is introduced into the casting chamber 2 under pressure and, in this case, completely fills out the solid casting section 10. The casting mould 3 comprises, in this case, two side shells 21 and one diecasting plunger 22. The liquid clay is introduced under a pressure of between 10 bar and 30 bar and the pressure during the action produced by the compressed air is within a similar range.

The casting mould 3 further comprises at least one slide 4. A plurality of slides 4, which serve to provide the opening 12 in the sanitary article 1, are arranged in the present embodiment. One slide 4 is preferably provided per opening 12. Said slides 4 can be pushed into the casting chamber 2 from an initial position and, in the inserted state, project into the casting chamber 2, the liquid clay then being supplied to the casting chamber 2. The slides 4 are preferably realized in a flexible manner so that they can also be supplied to places that are difficult to access such as, for example, to the bead section 20. Nevertheless, the slide 4 has a strength or a bending strength which prevents the slide 4 being pressed towards the inner wall 6 of the casting mould 3 by the liquid clay when the liquid clay is introduced. As a result, the slide 4 is located in a dimensionally stable manner in the casting mould 3 with reference to the incoming liquid clay. The shape of the slide 4 and its function are now explained below.

It can also be said in summary that a device for producing a sanitary article from ceramic comprises a casting mould 3 with a casting chamber 2 and at least one slide 4 which is arranged in the casting mould 3 and can be pushed into the casting chamber 2 at least partially from an initial position along an insertion direction E and can be removed from the casting chamber in the opposite direction, it being possible to provide an opening 12 or a break-through in the sanitary article 1 by means of the slide 4.

The method according to the invention for producing a sanitary article 1 comprises the step of introducing liquid clay into the casting chamber 2 of a casting mould 3, the step of hardening the liquid clay and the step of separating the casting mould 3 for removing the hardened sanitary article 1 out of the casting mould. Prior to the step of introducing the liquid clay, at least one slide 4 is introduced or pushed from outside the casting chamber 2 at least partially into the casting chamber 2 along an insertion direction E. The slide 4 is then removed out of the casting chamber 2 in opposition to the insertion direction E prior to or during the step of separating the casting mould 3 out of the casting chamber 2. Consequently, an opening, such as for example the opening 12 in the bead section 20, an indentation or a break-through can be provided by means of the slide 4.

The solid casting section 10 and the hollow casting section 8 are filled during the step of introducing the liquid clay. The hollow casting section 8 is acted upon with compressed air such that the liquid clay is pressed against the inner wall 6 of the casting chamber 3. In the solid casting section 10, the liquid clay is filled under pressure into the casting chamber between the inner wall 6 and the diecasting plunger 22.

After the action with the compressed air has been successful or prior to the removal of the diecasting plunger 22, the slide 4 is removed from the casting chamber 3 in opposition to the insertion direction E.

The slide 4, in this case, is arranged so as to be displaceable along a channel 5 which is arranged in a fixed manner in the casting mould 3 and opens out into the casting chamber 2 by means of the inner wall 6. The channel 5, consequently, provides the guiding for the slide 4, one channel 5 each being provided per slide 4. The channel 5 comprises at least one deflection section 13 by way of which the slide 4 can be arranged at or guided to the desired position in the desired direction. Using the deflection section 13, obstacles that are produced by the structural engineering are able to be circumvented, such as, for example, in this case, the form of the upper section of the side wall 17 between the bead section 20 and the seat or the flange 16. As a result, in this case, the slide 4 can be supplied in a lateral manner with respect to the side wall 17 and then, prior to entering the casting chamber 2, can be guided in a corresponding manner. The deflection section 13, therefore, deflects the channel 5 with reference to the inner wall 6 in such a manner that the slide 4 is deflected during its movement into the casting chamber 2, as result of which it is possible to form openings 12 which it is not possible to produce using conventional methods, such as, for example, a drilling method.

The degree of flexibility provided for the slide 4 differs in dependence on the angle of the deflecting by means of the deflection section 13. Where a deflecting has narrow radii it is consequently advantageous to realize the slide 4 in a more flexible manner than where a deflection has larger radii. With reference to the flexibility of the slide 4, however, it must be noted again that said flexibility must not be selected to be too great because otherwise, when the liquid clay is introduced, the slide 4 is pressed towards the inner wall 6 of the casting mould 3. As a result, with reference to the flexibility of the slide 4, it can be said that it should be great enough to move the slide in the channel 5, and that it should be small enough to prevent deformation when the liquid clay is introduced. In other words: The end 7 of the slide 4 which projects into the casting chamber 2 has to have a rigidity of such a type that the slide 4 maintains its position when the liquid clay is introduced.

The cross section of the slide 4 corresponds to the cross section of the opening 12 to be produced. The slide 4 shown in the Figures has a circular cross section, as a result of which it is possible to produce openings 12 also with a round cross section. Other cross sections, such as angular, polygonal, elliptical etc. are equally conceivable. In an advantageous manner, such a slide 4 has a diameter within the range of between 1 mm and 5 mm or even 10 mm, larger or even smaller slides also being conceivable.

The slide 4 is preferably made of plastics material, in particular of a polyamide, such as nylon. Good results have been achieved using a nylon fibre or nylon wire with a diameter of 2.5 mm. As an alternative to this, the slide can be produced from a metallic material.

The slide 4 is preferably realized in one piece. In an alternative embodiment, the slide 4 consists of at least two parts, namely a tip which forms the free end 7 and a shaft. The tip, in this case, is of a material which has a greater rigidity than the shaft. The shaft, which is guided by means of the deflection section 13, is then of a flexible material, whilst the tip is of a more rigid material. Consequently, this takes into account the condition where the slide is to have greater flexibility on account of the deflection, whilst the slide section or the free end 7 which projects into the casting chamber 2 is to have as high a degree of rigidity as possible.

The deflection section 13, in this case, is realized in a curved manner as a curved section, the curved section 13 being connected by means of a supply section 14, which, in this case, extends at an angle with respect to the inner wall 6. At the other end, the curved section 13 is connected to an end section 15, the end section 15 opening out directly or indirectly into the casting chamber 2.

In the present embodiment, the channel 5 opens out into the casting chamber 2 substantially in a predetermined direction, in this case parallel to the inner wall 6 of the casting chamber 2. The slide 4, in the state projecting into the casting chamber 2, consequently lies parallel to the inner wall 6 by way of its free end 7. Consequently, it is possible to provide an opening 12 which has the desired direction.

Figure 3:
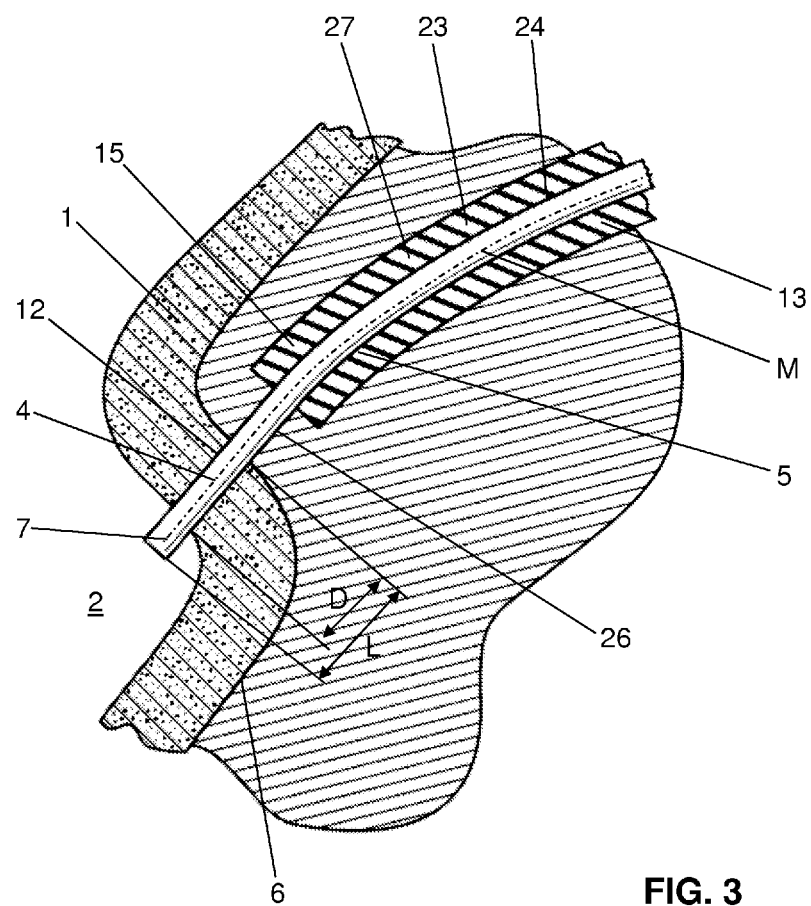
FIG. 3 shows view of a detail in FIG. 2.

As can easily be seen in FIGS. 2 and 3, in this case, the slide 4 projects into the hollow casting section 8 of the casting mould 3 by way of its free end 7. If the opening 12 is to provide a break-through in the sanitary article 1, the length L of the free end 7 along the inner wall 6 of the casting chamber 2 is greater than the thickness of the sanitary article 1 in the corresponding region where the opening 12 is to be located. In so far as only one indentation is to be formed, the length L is to be selected shorter.

As an alternative to this, however, the slide 4 can also be arranged in the solid casting section 10, the slide 4 extending, in this case, from the inner wall 6 as far as up to or into the diecasting plunger 22 when the opening 12 is to be a break-through. What has been said above applies in an analogous manner with reference to an indentation.

In addition, the preferable design of the channel 5 can be seen in FIG. 3. The channel 5 is preferably in the form of a pipe 23 recessed in the casting mould 3. The pipe 23, in this case, comprises a side wall 27 which runs around a centre axis M and defines an interior 24. The slide 4 is movable with reference to the pipe 23 in the interior 24 such that the slide 4 is movable along the insertion direction E or in opposition to the insertion direction E. The pipe 23 is realized in sections in a bent or curved manner so that the deflection section 13 is able to be provided.

The end face 25 of the pipe is arranged offset with reference to the inner wall 6 of the casting chamber 2, a passage 26, which is arranged in the casting mould 3 and extends from the end face 25 as far as up to the inner wall 6, connecting to the end face 25. The slide 4 is supplied to the casting chamber 2 by means of the passage 26. The advantage of this design is that the inner wall 6 of the casting chamber 2 is not interrupted unnecessarily, which results in an advantageous casting with a smooth surface. In addition, it would also be conceivable for the passages 26 to be arranged in a guide ring which surrounds the casting chamber 2.

As an alternative to this, the end face 25 can also be arranged in a flush manner with the inner wall 6, the end face 25 then forming part of the inner wall 6. Said embodiment is preferably used whenever lesser demands are made with reference to surface quality.

In this context it must be noted that the orientation of the passage 26 or of the pipe 23 influences the angle of the bore in the sanitary article 1 because the slide 4 projects into the casting chamber 2 along this direction. Consequently, there is also the advantage that each pipe 23 or each passage 26 is able to be adjusted on its own and individually into the required direction.

The pipe 23 can be of plastics material, metal or a combination of plastics material and metal.

Figure 4:
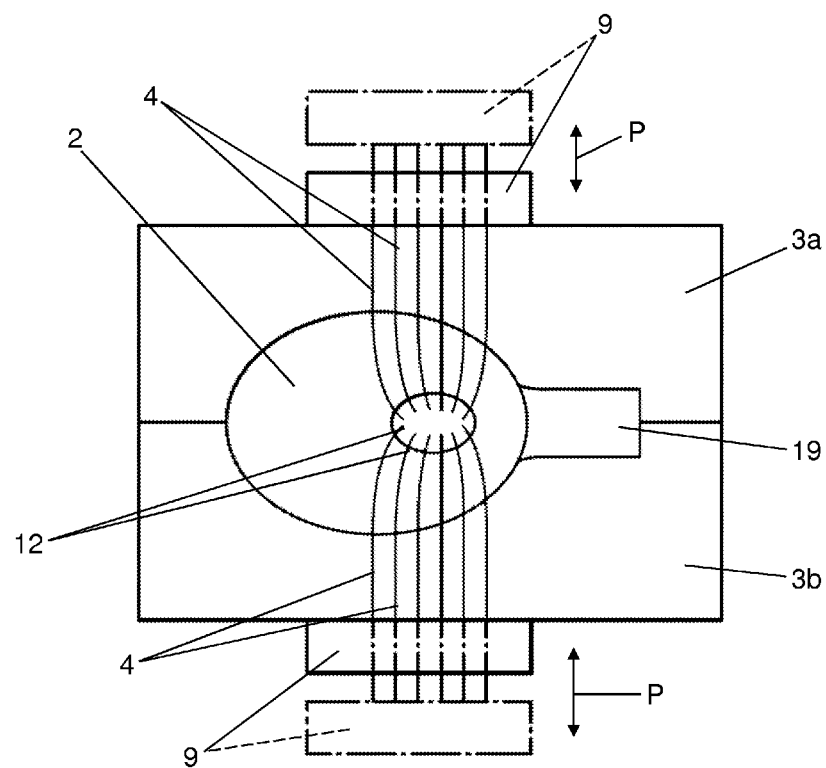
FIG. 4 shows a view of the casting mould from above.

FIG. 4 shows that in a preferred embodiment several slides 4 are connected together by means of one actuator element 9. The actuator element 9 is consequently able to actuate several slides 4 together and is movable along the arrow P from an idle position 9, in this case shown by a dot-dash line, into a casting position, in this case shown by solid lines. In this latter position, the slides 4 protrude in the casting chamber 2. Two actuator elements 9, which are each associated with a casting side 3a, 3b of the casting mould 3, are provided in this case.

Irrespective of the arrangement of the actuator element 9, it must be noted here that all the slides 4 are preferably moved together at the same time.

In summary it must be mentioned here that the advantage of a slide 4 according to the present invention is that as a result of the flexible design of the slide 4, it is possible to create an opening in a simple manner on a ceramic sanitary article at a position that is difficult to access.

LIST OF REFERENCES

| | |
|---|---|
| 1 | Sanitary article, toilet bowl |
| 2 | Casting chamber |
| 3 | Casting mould |
| 4 | Slide |
| 5 | Channel |
| 6 | Inner wall |
| 7 | Free end |
| 8 | Hollow casting section |
| 9 | Actuator element |
| 10 | Solid casting section |
| 11 | Rod |
| 12 | Opening in the sanitary article |
| 13 | Deflection section |
| 14 | Supply section |
| 15 | End section |
| 16 | Seat/flange |
| 17 | Side wall |
| 18 | U-bend section |
| 19 | Connecting pipe |
| 20 | Bead section |
| 21 | Side shells |
| 22 | Diecasting plunger |
| 23 | Pipe |
| 24 | Interior |
| 25 | End face |
| 26 | Passage |
| 27 | Side wall of pipe |

The invention claimed is:

1. A method for producing a sanitary article, wherein the method comprises
    the step of introducing liquid clay into the casting chamber of a casting mould,
    the step of hardening the liquid clay in the casting mould and
    the step of separating the casting mould for removing the hardened sanitary article out of the casting mould, wherein the method further comprising
    prior to the step of introducing the liquid clay, the step of introducing a slide from outside the casting chamber along an insertion direction at least partially into the casting chamber,
    wherein the slide is removed out of the casting chamber in opposition to the insertion direction prior to or during the step of separating the casting mould, wherein an opening, an indentation or a break-through is provided in the sanitary article by means of the slide, and
    wherein the slide comprises several identical slides arranged next to one another which are connected together with one actuator element and are actuated together by the actuator element during the step of introducing the slide and/or the step of removing the slide.

2. The method according to claim 1, wherein the slide is displaced along a channel, which is arranged fixedly in the casting mould and opens out into the casting chamber via an inner wall, wherein the channel comprises at least one deflection section which deflects the channel with reference to the inner wall, wherein the slide is realized in a flexible manner such that the slide is deflected during the movement.

3. The method according to claim 2, wherein the deflection section is realized in a curved manner as a curved section, wherein the curved section is connected by means of a supply section, and wherein the curved section, opposite to the supply section, is connected to an end section which opens out directly or indirectly into the casting chamber.

4. The method according to claim 3, wherein said supply section extends at an angle with respect to the inner wall.

5. The method according to claim 1, wherein the channel opens out into the casting chamber in a predetermined direction with respect to the inner wall of the casting chamber such that, in the state projecting into the casting chamber, the slide lies in the casting mould parallel to the inner wall by way of its free end.

6. The method according to claim 5, wherein said predetermined direction is substantially parallel with respect to the inner wall of the casting chamber.

7. The method according to claim 1, wherein the slide projects into the casting chamber by way of a free end and wherein the length of the free end along the inner wall of the casting chamber is preferably greater than the thickness of the sanitary article in the region.

8. The method according to claim 7, wherein the slide projects into a hollow casting section.

9. The method according to claim 8, wherein during the step of introducing the liquid clay a solid casting section and a hollow casting section are filled, wherein the hollow casting section is acted upon with compressed air such that the liquid clay is pressed onto the inner wall of the casting chamber, wherein once said action with compressed air has been successful, the slide is removed in opposition to the insertion direction out of the casting chamber.

10. A device for molding a sanitary article, wherein the device comprises
    a casting mould with a casting chamber,
    a slide which can be pushed at least partially into the casting chamber from outside the casting chamber along an insertion direction and prior to the step of separating the casting mould can be removed out of the casting mould in opposition to the insertion direction out of the casting chamber, wherein an opening, an indentation or a break-through is provided in the sanitary article by means of the slide,
    wherein the slide comprises several identical slides arranged next to one another which are connected together with one actuator element and can be actuated together by the actuator element.

11. The device according to claim 10, wherein the slide is displaceable along a channel which is arranged fixedly in the casting mould and opens out into the casting chamber by means of an inner wall, wherein the channel comprises at least one deflection section which deflects the channel with reference to the inner wall such that the slide is deflected during the movement.

12. The device according to claim 11, wherein said deflection section is realized in a curved manner as a curved section, wherein the curved section is connected by means of a supply section which preferably extends at an angle with respect to the inner wall, and wherein the curved section, opposite to the supply section, is connected to an end section which opens out directly or indirectly into the casting chamber.

13. The device according to claim 10, wherein the channel opens out into the casting chamber in a predetermined direction, preferably substantially parallel, with respect to the inner wall of the casting chamber such that, in the state projecting into the casting chamber, the slide lies in the casting mould parallel to the inner wall by way of its free end.

14. The device according to claim 10, wherein at least the free end of the slide, which projects into the casting chamber, has a rigidity of such a type that the slide maintains its position when the liquid clay is introduced, and wherein the slide has a flexibility which allows for the movement of the slide through the deflection section.

15. The device according to claim 10, wherein the slide is plastics material, in particular nylon, and/or metal.

16. The device according to claim 10, wherein the slide projects into the casting chamber, in particular into a hollow casting section, by way of a free end and in that the length of the free end along the inner wall of the casting chamber is preferably greater than the thickness of the sanitary article in the region.

17. The device according to claim 10, wherein the casting mould has a solid casting section and a hollow casting section, wherein the slide is preferably arranged in the hollow casting section.

18. The device according to claim 10, wherein the channel is in the form of a pipe recessed in the casting mould, wherein the slide is movable in the interior of the pipe, and wherein the pipe is realized in sections in a bent or curved manner, wherein the end face of the pipe is flush with the inner wall of the casting chamber, or wherein the end face of the pipe is arranged offset from the inner wall of the casting chamber, wherein the channel is assembled from the pipe and a passage, which connects to the pipe and is part of the casting mould.

19. A method of using a device according to claim 10, comprising producing a toilet bowl with the device, wherein the toilet bowl has a flange, a side wall which is realized in a circumferential manner connecting to the flange and a connecting pipe which connects to the side wall and has a U-bend section, wherein, in the region of the side wall, the toilet bowl has a plurality of openings which can be provided by means of the slide.

* * * * *